H. HEWITT.
Rotary Harrow.
No. 27,668. Patented Mar. 27, 1860.
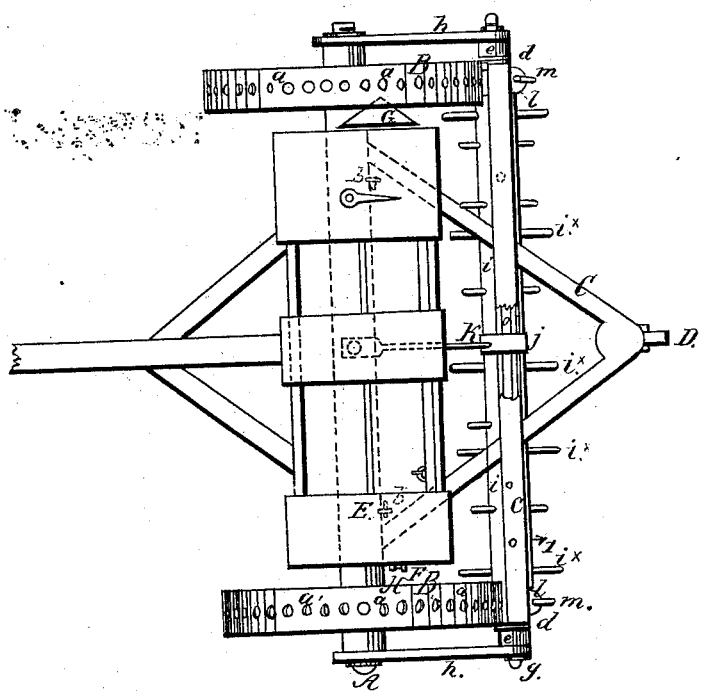
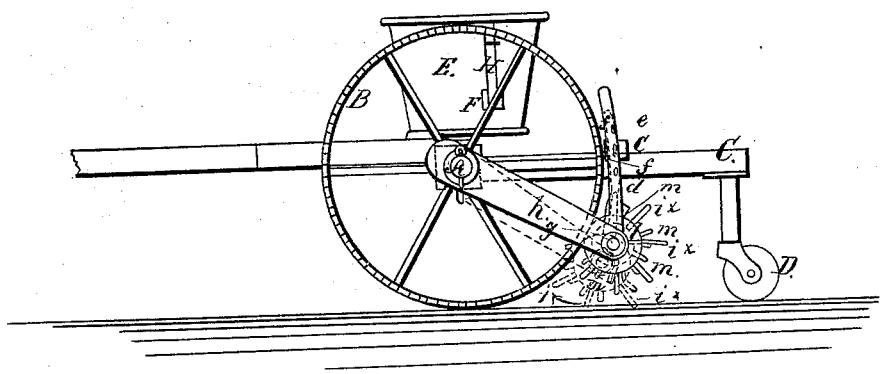
Witnesses:
R. S. Spencer
J. W. Coombs.
Inventor:
Henry Hewitt

UNITED STATES PATENT OFFICE.

HENRY HEWITT, OF SAN FRANCISCO, CALIFORNIA, ASSIGNOR TO W. A. SANFORD, OF POTSDAM, NEW YORK.

IMPROVEMENT IN SEEDING-HARROWS.

Specification forming part of Letters Patent No. 27,668, dated March 27, 1860.

REISSUED

*To all whom it may concern:*

Be it known that I, HENRY HEWITT, of San Francisco, in the county of San Francisco and State of California, have invented a new and Improved Rotary Harrow; and I do hereby declare that the following is a full, clear, and exact description of the same, reference being had to the annexed drawings, making a part of this specification, in which—

Figure 1 is a plan or top view of my invention; Fig. 2, a side elevation of the same.

Similar letters of reference indicate corresponding parts in the two figures.

The object of this invention is to obtain a rotary harrow which may be used alone or with a seeding-machine, and be adapted for operating a greater or less depth into the earth, as the nature of the work may require, and also be adapted for operating as efficiently in hard clayey soils as in loose friable ones.

To enable those skilled in the art to fully understand and construct my invention, I will proceed to describe it.

A represents an axle; B B, its wheels, the peripheries of which are perforated with holes $a$ at equal distances apart to form gears, as shown clearly in Fig. 1. To the back side of the axle A a V-shaped frame, C, is attached by joints $b\ b$, as shown by the dotted lines in Fig. 1. The outer end of the frame C is supported by a caster-wheel, D. On the frame C a traverse-bar, $c$, is secured. This bar extends outward from the frame C at each side as far as the outer edges of the wheels B B, and pendants $d\ d$ are attached to the ends of the bar $c$ by hooks $e$, which pass through either of a series of holes, $f$, in the pendants. Through the lower parts of the pendants $d\ d$ a shaft, $g$, passes loosely, the ends of said shaft also passing loosely through the outer parts of radius-bars $h\ h$, the front parts of which are fitted loosely on the ends of the axle A.

On the shaft $g$ two cylinders, $i\ i$, are placed loosely, so that they may rotate freely thereon. These cylinders are of equal length, and their inner ends are fitted in a bearing, $j$, which is attached to the outer end of an arm, $k$, the inner end of which is connected loosely or by a joint to the axle A. Each cylinder $i$ is provided with teeth $i^x$ of a suitable length. At the outer end of each cylinder $i$ there is a hub, $l$, and these hubs have teeth or pins $m$ at their peripheries, which teeth or pins work into the perforation $a$ of the wheels B B.

The operation is as follows: As the implement is drawn along the wheels B B communicate a rotary motion to the cylinders $i\ i$ through the medium of the toothed hubs $l$, the cylinders rotating in the direction indicated by the arrows 1, and the teeth $i^x$ penetrating and pulverizing the earth in a very efficient manner, the draft movement of the machine greatly favoring the operation of the rotary harrow when rotating in the direction indicated. The frame C, and consequently the harrow, is allowed to rise and fall to conform to the inequalities of the surface of the ground, and the harrow may be adjusted higher or lower, according to the depth it is desired to have the harrow-teeth $i^x$ penetrate the earth, by adjusting the hooks $e$ in the proper holes $f$ in the pendants. In case the soil is hard and resists the action of the teeth $i^x$, the frame C may be loaded with any suitable substance, so as to insure the proper penetration of the teeth into the soil. The caster-wheel D admits of the implement being readily turned, and it is to facilitate this turning operation that the harrow is made of two parts.

By having the harrow driven by the gearing formed by perforating the peripheries of the wheels B, and the teeth $m$ of the hubs $l$ working therein, the gearing cannot become clogged, as the teeth $m$ serve as clearers. The arm $k$ of bearing $j$ is made with a slide-joint, so that it may be adjusted to correspond with the bars $h$.

When the implement is to be used as a harrow for the express purpose of pulverizing the soil no other parts are attached besides those already described; but when the implement is designed for a seed-coverer as well as a pulverizer any suitable seed-distributing device may be placed on the axle A and driven from one or both of the wheels B.

In the drawings a seed-box, E, is shown placed on the axle, said box being provided with a seed-slide, F, provided at one end with a V-shaped projection, G, against which the spokes of the wheels B act, a spring, H, bearing against the opposite end of the slide. The V-shaped projection G at one end of the seed-slide, acted upon by the wheel and the spring H at the opposite end of the slide, give the latter a reciprocating movement. The bottom of the seed-box has a perforated plate fitted in it and an adjustable perforated slide placed over it to regulate the discharge of the seed. The above parts, however, form a well-known seed-distributing device. Other seed-distributing devices may be used, if preferred.

I would remark that it is essential that the harrow be thrown out of gear with the driving-wheels B in order, when necessary, to facilitate the removal of the implement from place to place. This may be effected in various ways; but the simplest plan would probably be to have the holes at the front ends of the bars $h$ elongated and provided with a key or plug to admit of a longitudinal adjustment of said bars $h$ to effect the desired end.

I am aware that rotary harrows have been previously used, both singly and in connection with seed-distributing devices, and I therefore do not claim broadly such device; but

I claim as new and desire to secure by Letters Patent—

The arrangement of the axle A, bars $h\ h$, shaft $g$, cylinders $i\ i$, bearing $j$, arm $k$, hubs $l\ l$, wheels B B, pendants $d\ d$, frame C, caster-wheel D, seed-boxes E E, and slide F, as and for the purpose herein shown and described.

HENRY HEWITT.

Witnesses:
   MICH. HUGHES,
   WM. THOMPSON.